(12) United States Patent
Fujiwara (10) Patent No.: US 9,296,356 B2
(45) Date of Patent: Mar. 29, 2016

(54) VEHICLE SIDE AIR BAG DEVICE (71) Applicant: TOYOTA JIDOSHA KABUSHIKI KAISHA, Toyota-shi, Aichi-ken (JP)

(72) Inventor: Yusuke Fujiwara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/414,997

(22) PCT Filed: Jun. 13, 2013

(86) PCT No.: PCT/JP2013/066396
§ 371 (c)(1),
(2) Date: Jan. 15, 2015

(87) PCT Pub. No.: WO2014/013822
PCT Pub. Date: Jan. 23, 2014

(65) Prior Publication Data
US 2015/0197212 A1    Jul. 16, 2015

(30) Foreign Application Priority Data

Jul. 19, 2012   (JP) .................................. 2012-160476

(51) Int. Cl.
*B60R 21/231*        (2011.01)
*B60R 21/233*        (2006.01)
(Continued)

(52) U.S. Cl.
CPC ......... *B60R 21/23138* (2013.01); *B60R 21/233* (2013.01); *B60R 21/235* (2013.01); *B60R 21/261* (2013.01); *B60R 2021/23146* (2013.01); *B60R 2021/23308* (2013.01);

(Continued)

(58) Field of Classification Search
CPC ............ B60R 21/23138; B60R 21/261; B60R 21/235; B60R 21/233; B60R 2021/23576; B60R 2021/23308; B60R 2021/2615; B60R 2021/23324; B60R 2021/23146
See application file for complete search history.

(56) References Cited

U.S. PATENT DOCUMENTS

| | | | |
|---|---|---|---|
| 2003/0168836 A1* | 9/2003 | Sato | ...................... B60R 21/235 |
| | | | 280/730.2 |
| 2004/0124615 A1* | 7/2004 | Tanase | .................. B60R 21/207 |
| | | | 280/730.2 |
| 2006/0022441 A1 | 2/2006 | Hayashi et al. | |

(Continued)

FOREIGN PATENT DOCUMENTS

| | | |
|---|---|---|
| JP | 2007197008 A | 8/2007 |
| JP | 2010132072 A | 6/2010 |

(Continued)

*Primary Examiner* — Ruth Ilan
*Assistant Examiner* — Darlene P Condra
(74) *Attorney, Agent, or Firm* — Oliff PLC (57) ABSTRACT

In a side air bag of a vehicle side air bag device, a front bag portion and a rear bag portion are partitioned by a longitudinal partition portion. Further, a forward extending portion provided in an upper part of the rear bag portion so as to restrain a shoulder is partitioned from the front bag portion by an upper partition portion extending diagonally upward toward a front side of a seatback from an upper end of the longitudinal partition portion. When an inflator is activated, the rear bag portion is expanded and unfolded at an early stage, so that gas in the rear bag portion is supplied into the front bag portion via a communicating opening provided in the longitudinal partition portion. Hereby, it is possible to push up an upper arm by the front bag portion, and to restrain rear parts of a chest and abdomen and shoulder.

11 Claims, 5 Drawing Sheets

(51) Int. Cl.
*B60R 21/235* (2006.01)
*B60R 21/261* (2011.01)

(52) U.S. Cl.
CPC ............... *B60R 2021/23324* (2013.01); *B60R 2021/23576* (2013.01); *B60R 2021/2615* (2013.01)

(56) References Cited

U.S. PATENT DOCUMENTS

2012/0025499 A1* 2/2012 Shibayama ........... B60R 21/233
 280/730.2
2012/0200072 A1* 8/2012 Fukawatase ...... B60R 21/23138
 280/741
2013/0033022 A1* 2/2013 Yamamoto ............ B60R 21/231
 280/730.2

FOREIGN PATENT DOCUMENTS

| | | | |
|---|---|---|---|
| JP | 2011031719 | A | 2/2011 |
| JP | 2011162012 | A | 8/2011 |
| JP | 2011240807 | A | 12/2011 |
| JP | 2012025182 | A | 2/2012 |
| JP | 5423903 | B1 | 2/2014 |
| WO | 2004065179 | A1 | 8/2004 |
| WO | 2013183130 | A1 | 12/2013 |

* cited by examiner

VEHICLE SIDE AIR BAG DEVICE

TECHNICAL FIELD

The present invention relates to a vehicle side air bag device.

BACKGROUND ART

In a vehicle side air bag device described in Patent Document 1, a side air bag includes a rear-side tube bag portion configured to extend in a vertical direction on a vehicle rear side relative to a vehicle-width outer end of a chest of a sitting occupant at the time when a side air bag is expanded and unfolded. Further, the side air bag includes a front-side tube bag portion configured to be placed on a vehicle front side relative to the rear-side tube bag portion and on a vehicle front side relative to the vehicle-width outer end of the chest of the sitting occupant and to extend in the vertical direction, at the time when the side air bag is expanded and unfolded. An upper part of the rear-side tube bag portion is placed on a lateral side of a shoulder of the sitting occupant so as to serve as a shoulder restraining portion that restrains the shoulder, and an upper edge of the front-side tube bag is placed at a position lower than a side of the sitting occupant on the vehicle front side relative to the shoulder restraining portion, and serves as an arm support portion on which an upper arm of the sitting occupant is placed.

That is, in the vehicle side air bag device, that shoulder of the sitting occupant which has a relatively high resistance is restrained by the shoulder restraining portion, while the upper arm of the sitting occupant is placed on the arm support portion, so as to prevent the upper arm from being placed between an air bag and that chest of the sitting occupant which has a relatively low resistance.

Examples of the prior art document related to the present invention include Patent Documents 2 to 4.

CITATION LIST

Patent Documents

Patent Document 1: Japanese Patent Application Publication No. 2010-132072 (JP 2010-132072 A)
Patent Document 2: Japanese Patent Application Publication No. 2011-240807 (JP 2011-240807 A)
Patent Document 3: Japanese Patent Application Publication No. 2012-025182 (JP 2012-025182 A)
Patent Document 4: International Publication WO 2004/065179

SUMMARY OF THE INVENTION

Problem to be Solved by the Invention

In the side air bag device described above, the side air bag is large so that the side air bag can restrain from the shoulder to the lumbar of the sitting occupant. Because of this, it takes time before the side air bag is completely expanded and unfolded. However, the rear-side tube bag portion accommodating an inflator therein is expanded and unfolded at an early stage, so that it is possible to obtain a good initial restraining performance of the side air bag with respect to the sitting occupant. However, since the shoulder restraining portion of the rear-side tube bag portion is configured to restrain only a rear part of the shoulder of the sitting occupant, the shoulder of the sitting occupant may come off from the shoulder restraining portion unexpectedly. On that account, there is room for improvement from a viewpoint of improving a restraining performance of the side air bag with respect to the sitting occupant.

The present invention is accomplished in view of the above fact, and is intended to obtain a vehicle side air bag device which is able to prevent an upper arm from being placed between a side air bag and a chest of a sitting occupant and which is able to improve a restraining performance of the side air bag with respect to the sitting occupant.

Means for Solving the Problem

A vehicle side air bag device according to a first aspect of the present invention includes: an inflator provided in a vehicle seat and configured to be activated to generate gas when a side collision of a vehicle is detected or predicted; and a side air bag provided in a side portion of a seatback of the vehicle seat and configured to be expanded and unfolded between a sitting occupant and a vehicle-body side portion when the gas generated from the inflator is supplied thereinside, the side air bag including: a front bag portion configured to restrain front parts of a chest and an abdomen of the sitting occupant; a rear bag portion configured to restrain rear parts of the chest and the abdomen of the sitting occupant, the rear bag portion being configured such that a forward extending portion configured to restrain a shoulder of the sitting occupant is provided in an upper part thereof and the inflator is provided thereinside; a longitudinal partition portion configured to partition the front bag portion from the rear bag portion, the longitudinal partition portion having a communicating opening configured to communicate an inside of the front bag portion with an inside of the rear bag portion; and an upper partition portion extending diagonally upward toward a front side of the seatback from an upper end of the longitudinal partition portion in an expanded and unfolded state, the upper partition portion being configured to partition the forward extending portion from the front bag portion and to go upward toward the front side relative to that front-rear direction of the seatback which is perpendicular to a height direction of the seatback in a seat side view.

Note that, in the first aspect, a positional relationship between the sitting occupant and the side air bag is set based on a positional relationship between a world side impact dummy (World SID) sitting on a vehicle seat and the side air bag.

In the first aspect, when a side collision of the vehicle is detected or predicted, the inflator is activated to generate gas, so that the gas is supplied into the side air bag. Hereby, the side air bag is expanded and unfolded between the sitting occupant and the vehicle-body side portion. In the side air bag, the front bag portion configured to restrain the front parts of the chest and the abdomen of the sitting occupant and the rear bag portion configured to restrain the rear parts of the chest and the abdomen are partitioned by the longitudinal partition portion. The inflator is provided in the rear bag portion, and the gas generated from the inflator is supplied into the front bag portion via the communicating opening provided in the longitudinal partition portion. This makes it possible to expand and unfold the rear bag portion earlier at a higher pressure than the front bag portion, so that those rear parts of the chest and the abdomen which have resistances relatively higher than the front parts of the chest and the abdomen can be restrained by the rear bag portion at an early stage.

Further, the forward extending portion configured to restrain the shoulder of the sitting occupant is provided in the upper part of the rear bag portion. The forward extending portion is expanded and unfolded at an early stage, so that the shoulder of the sitting occupant can be restrained at an early stage. Besides, the forward extending portion is partitioned from the front bag portion by the upper partition portion extending diagonally upward toward the front side of the seatback from the upper end of the longitudinal partition portion, and is expanded and unfolded toward the upper side of the front bag portion. That is, the upper partition portion extending upward relative to a front-rear direction of the seatback is set, and hereby, the upper part of the rear bag portion extends toward the upper side of the front bag portion, so as to restrain the shoulder of the sitting occupant. Since the upper partition portion is set as such, it is possible to suppress an increase in a capacity of the rear bag portion, and to make the upper part of the rear bag portion, that is, the forward extending portion successfully face the shoulder of the sitting occupant. As a result, the rear parts of the chest and the abdomen, and the shoulder can be restrained effectively, which is able to improve a restraining performance of the side air bag with respect to the sitting occupant.

Further, an inner side surface of the front bag portion in the vehicle width direction in an expanded and unfolded state is curved so that its upper side relative to its central part in the vertical direction goes upward toward an outer side in the vehicle width direction (directed toward the outer side in the vehicle width direction as it goes upward). Hereby, the side air bag and the sitting occupant relatively come close to each other due to an impact of a side collision, so that the surface thus curved makes slide contact with the upper arm of the sitting occupant, thereby causing a force to push up the upper arm. As a result, the upper arm is pushed up to the upper part of the front bag portion and restrained by the forward extending portion. Hereby, it is possible to prevent the upper arm from being placed between the chest of the sitting person and the side air bag, thereby making it possible to reduce a load to the chest.

A vehicle side air bag device according to a second aspect of the present invention is configured such that: in the first aspect, when an expanded unfolded state of the side air bag is viewed from a vehicle width direction, the upper partition portion is placed between a center of the shoulder of the sitting occupant and a longitudinally central part of an upper arm.

In the second aspect, since the upper partition portion of the side air bag is set as described above, a push-up force of the front bag portion to the upper arm can be successfully applied to the longitudinally central part of the upper arm, that is, near a centroid of the upper arm. Hereby, the upper arm can be pushed up effectively.

A vehicle side air bag device according to a third aspect of the present invention is configured such that: in the first or second aspect, when the expanded unfolded state of the side air bag is viewed from the vehicle width direction, the longitudinal partition portion is provided so as to extend toward the center of the shoulder from a position overlapping with a hip point of the sitting occupant up to a lower side of an underarm.

In the third aspect, since the longitudinal partition portion partitioning the front bag portion and the rear bag portion is set as described above, side surfaces of the chest and the abdomen of the sitting occupant can be restrained by the front bag portion and the rear bag portion so that the side surfaces are covered therewith along their curves from the front side and the rear side. Hereby, a positional relationship, in the vehicle front-rear direction, of the chest and the abdomen with the side air bag can be stabilized.

A vehicle side air bag device according to a fourth aspect of the present invention is configured such that: in any one of the first to third aspects, the longitudinal partition portion and the upper partition portion are constituted by a tether sewed to a base cloth of the side air bag or a seam formed by sewing the base cloth.

In the fourth aspect, the longitudinal partition portion and the upper partition portion are constituted by the tether or the seam. Accordingly, in a state where the side air bag is expanded and unfolded, an inner side surface of the side air bag in the vehicle width direction is recessed outwardly in the vehicle width direction, near the longitudinal partition portion and the upper partition portion. An intermediate part, in the front-rear direction, of the side surface of the chest (that is, a most projecting part toward the outer side in the vehicle with direction; the central part in the front-rear direction or near the central part in the front-rear direction) is fitted into a recessed portion formed near the longitudinal partition portion. This makes it possible to reduce a load to the chest (ribs or the like). Further, the upper arm pushed up by slide contact with the front bag portion is fitted into a recessed portion formed near the upper partition portion. Hereby, it is possible to successfully restrain the upper arm at a position where the upper arm is pushed up.

A vehicle side air bag device according to a fifth aspect of the present invention is configured such that: in the first or second aspect, a rectification member covering the inflator is provided in the rear bag portion, the rectification member including a body portion configured to guide the gas generated from the inflator to a vertical direction, and a branch portion branched from the body portion so that its tip side is inserted into the communicating opening, the branch portion being configured to guide the gas into the front bag portion along the upper partition portion from a tip opening thereof opened into the front bag portion.

In the fifth aspect, the body portion of the rectification member provided in the rear bag portion of the side air bag guides, in the vertical direction, the gas generated from the inflator. This makes it possible to successfully distribute gas to an upper part of the rear bag portion and a lower part thereof. Besides, a tip side of the branch portion branched from the body portion is inserted into the communicating opening provided in the longitudinal partition portion, so that the gas is guided into the front bag portion from the tip opening of the branch portion along the upper partition portion. This makes it possible to expand and unfold the upper part of the front bag portion at an early stage, so that the upper arm can be pushed up by the upper part of the front bag portion at an early stage.

A vehicle side air bag device according to a sixth aspect of the present invention is configured such that: in the fifth aspect, the branch portion is formed in a tubular shape of which a diameter is decreased toward the tip side.

In the sixth aspect, since the branch portion is formed as such, it is possible to increase a flow speed of the gas ejected from the tip opening of the branch portion toward the upper part of the front bag portion. As a result, an effect of pushing up the upper arm by the upper part of the front bag portion can be promoted.

A vehicle side air bag device according to a seventh aspect of the present invention is configured such that: in the fifth or sixth aspect, a vent hole is formed in a front end part of the front bag portion in the expanded unfolded state such that the vent hole is placed on a side lower than the branch portion.

In the seventh aspect, the gas guided from the tip opening of the branch portion of the rectification member to the upper part of the front bag portion is discharged outside the side air bag via the vent hole formed in the front end of the front bag portion, on a side lower than the tip opening. Hereby, it is possible to prevent the internal pressure of the front bag portion from increasing too high, thereby making it possible to reduce a load to the front parts of the chest and the abdomen having relatively low resistances. Besides, the tip opening of the branch portion and the vent hole are offset to the upper side and to the lower side, so that it is possible to prevent the gas supplied into the front bag portion from the tip opening from being discharged outside directly (linearly) from the vent hole. As a result, it is possible to secure an initial unfolding performance of the upper part of the front bag portion. Further, it is possible to adjust the internal pressure of the rear bag portion by discharging, outside the side air bag from the vent hole, the gas flowed into the front bag portion from the rear bag portion through the rectification member.

A vehicle side air bag device according to an eighth aspect of the present invention is configured such that: in any one of the first to seven aspects, an inclination angle of the upper partition portion relative to a front-rear direction of the seatback is set within a range of 30 to 60 degrees.

A vehicle side air bag device according to a ninth aspect of the present invention is configured such that: in any one of the first to eighth aspects, when the expanded unfolded state of the side air bag is viewed from the vehicle width direction, at least a range of a virtual circle having a diameter of 80ϕ around the center of the shoulder of the sitting occupant is restrained by the forward extending portion.

A vehicle side air bag device according to a tenth aspect of the present invention is configured such that: in any one of the first to ninth aspects, the height direction of the seatback is a direction connecting a center, in the front-rear direction, of an upper end of a seatback frame to a shaft center of a reclining rod in a seat side view.

A vehicle side air bag device according to an eleventh aspect of the present invention is configured such that: in any one of the first to tenth aspects, the front bag portion is set to have a vehicle-width dimension larger than that of the forward extending portion in the expanded unfolded state, and an inner side surface, in the vehicle width direction, of the front bag portion on its upper end side serves as an upper arm push-up surface inclined or curved so as to go upward toward an outer side in the vehicle width direction.

Advantageous Effects of Invention

As described above, in the vehicle side air bag device according to the present invention, it is possible to prevent an upper arm from being placed between a side air bag and a chest of a sitting occupant and to improve a restraining performance of the side air bag with respect to the sitting occupant.

MODES FOR CARRYING OUT THE INVENTION

First Embodiment

The following describes a vehicle side air bag device 10 according to a first embodiment of the present invention with reference to FIGS. 1 to 4. Note that an arrow FR, an arrow UP, and an arrow OUT, which are shown appropriately in each figure, indicate a vehicle front direction (a traveling direction), a vehicle upper direction, and an outer side in a vehicle width direction, respectively. Hereinafter, in a case where a description is made by use of merely front and rear directions and up and down directions, they indicate front and rear of a vehicle front-rear direction, and up and down of a vehicle vertical direction, respectively, unless otherwise specified.

Configuration

Figure 1:
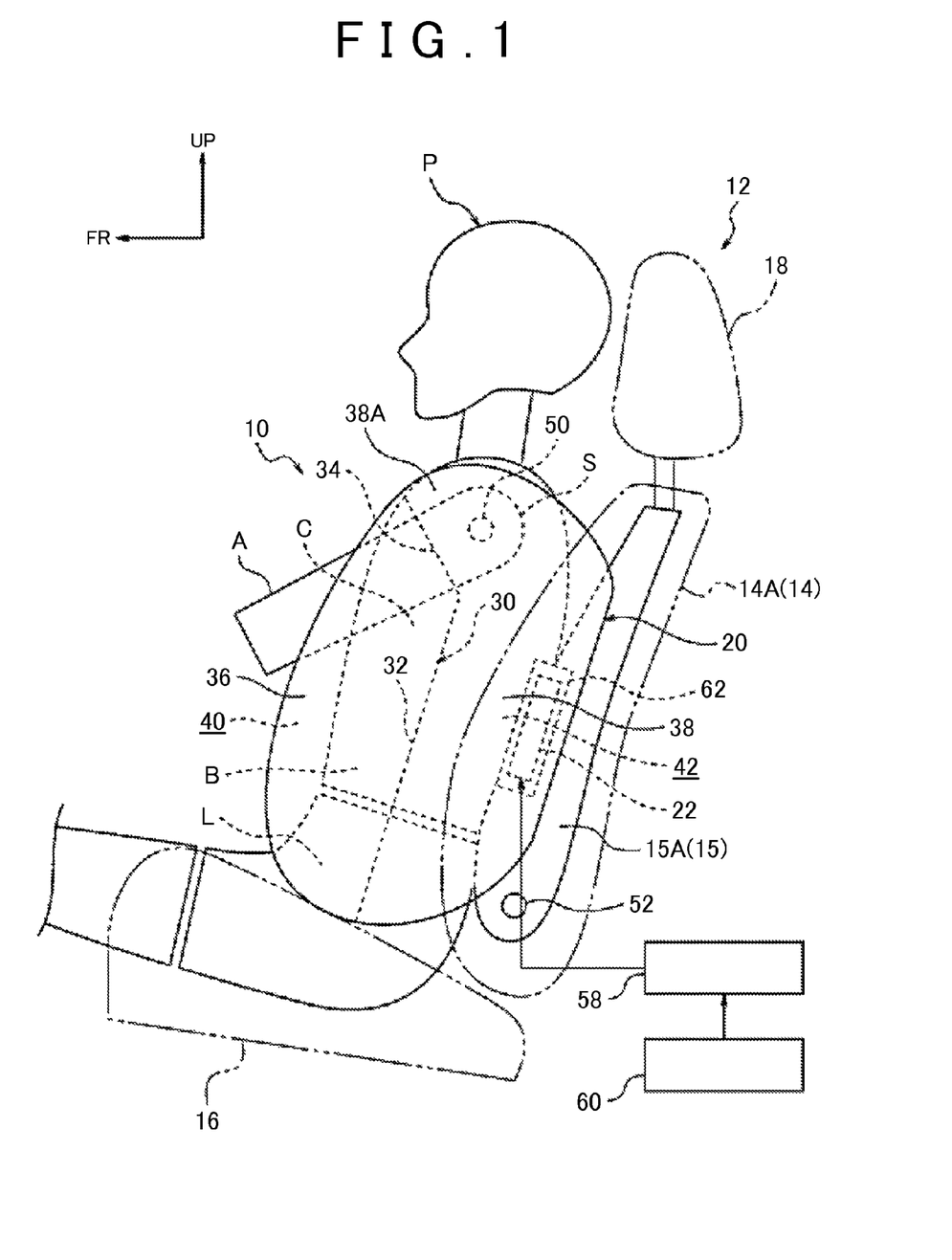
FIG. 1 is a side view of a vehicle seat provided with a vehicle side air bag device according to a first embodiment of the present invention, and illustrates an expanded unfolded state of a side air bag.

As illustrated in FIG. 1, the vehicle side air bag device 10 according to the present embodiment is provided in a door-side side portion 14A (a side portion closer to a side door (not shown)) of a seatback 14 in a vehicle seat 12. The seatback 14 is connected to a rear end of a seat cushion 16 in a tilting manner, and a headrest 18 is connected to an upper end of the seatback 14.

Note that, in the present embodiment, a front-rear direction, a right-left direction (width direction), and a vertical direction of the vehicle seat 12 coincide with the front-rear direction, the right-left direction (width direction), and the vertical direction of the vehicle. Further, in FIG. 1, a world side impact dummy (World SID) P sits on the vehicle seat 12, instead of an actual occupant. A sitting posture of the world side impact dummy P complies with a side impact test procedure performed on a vehicle in which the vehicle side air bag device 10 is provided. Further, an inclination angle (a reclining angle) of the seatback 14 relative to the seat cushion 16 is set to a reference setting position corresponding to the sitting posture. On account of the description, the world side impact dummy P is hereinafter referred to as the "sitting occupant P."

The side air bag device 10 mainly includes a side air bag 20, and an inflator (gas generator) 22 configured to generate gas in the side air bag 20. The side air bag 20 is folded and unitized with the inflator 22, etc., and is disposed (housed) in the door-side side portion 14A. Upon receipt of a pressure of gas generated from the inflator 22, the side air bag 20 is expanded and unfolded between the sitting occupant P and a side door (a vehicle side portion) (see the state in FIG. 1). At the time when the side air bag 20 is expanded and unfolded, a seatback pad 24 (see FIG. 3) and a seat skin (not shown) disposed in the door-side side portion 14A are broken by receiving an inflation pressure of the side air bag 20. Note that front, rear, upper, and lower directions of the side air bag 20 to be describe in the following description indicate directions in a state where the side air bag 20 is expanded and unfolded, unless otherwise specified, and generally coincide with front, rear, upper, and lower directions of the seatback 14.

As illustrated in FIGS. 1 to 4, the side air bag 20 is a so-called twin chamber side air bag, and is formed in a sack shape by sewing one base cloth 28 formed by cutting a nylon or polyester fabric material, for example. The base cloth 28 is folded along a fold line 29 illustrated in FIGS. 2 and 3 to superimpose one side portion 28A on the other side portion 28B via the fold line 29, and outer peripheries of them are sewed at a seam (a sewing portion) T1 (not shown in FIG. 1). The side air bag 20 may be formed by sewing outer peripheries of two base cloths superimposed on each other.

In an expanded unfolded state, the side air bag 20 is disposed so that the one side portion 28A of the base cloth 28 faces an inner side (a sitting-occupant-P side) in the vehicle width direction and the other side portion 28B of the base cloth 28 faces an outer side (a side-door side) in the vehicle width direction. Further, the side air bag 20 is formed generally in an oblong shape elongated along a seatback height direction in a side view of the expanded unfolded state as illustrated in FIGS. 1 and 2, and has a size that can restrain a shoulder S, a chest C, an abdomen B, and a lumbar L of the sitting occupant P.

The inside of the side air bag 20 is partitioned off by a tether (a partition cloth) 30 formed in a long belt shape by a fabric material similar to the base cloth 28. The tether 30 is configured such that one long side edge portion is sewed to the one side portion 28A of the base cloth 28 at a seam (a sewing portion) T2 (see FIGS. 3 and 4; not shown in FIGS. 1 and 2) and the other long side edge portion is sewed to the other side portion 28B of the base cloth 28 at a seam (a sewing portion) T3 (see FIGS. 3 and 4; not shown in FIGS. 1 and 2). The tether 30 is constituted by a longitudinal partition portion 32 extending in the seatback height direction from a vertically intermediate part of the side air bag 20 to a lower part thereof, and an upper partition portion (an inclination partition portion) 34 extending diagonally upward toward a front side of the seatback 14 from an upper end of the longitudinal partition portion 32. The side air bag 20 is partitioned into a front bag portion 36 and a rear bag portion 38.

An inside of the front bag portion 36 is a front chamber 40, and an inside of the rear bag portion 38 is a rear chamber 42. The front chamber 40 and the rear chamber 42 communicate with each other via one or more (herein, paired upper and lower) communicating openings 46, 48 formed in the longitudinal partition portion 32 (see FIGS. 2 and 3; not shown in FIG. 1).

Figure 2:
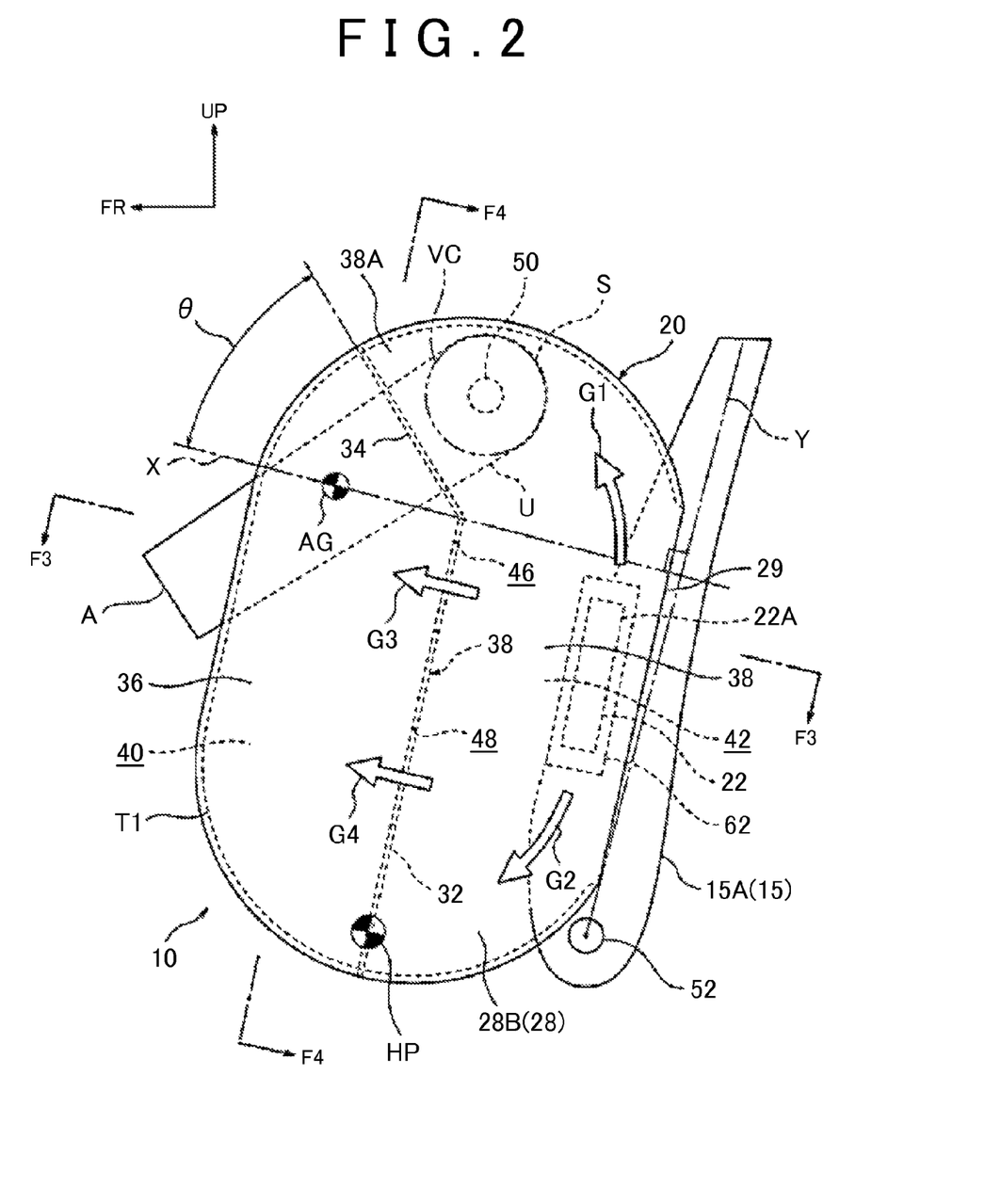
FIG. 2 is an enlarged side view illustrating the side air bag in an enlarged manner.

As illustrated in FIG. 2, when the expanded unfolded state of the side air bag 20 is viewed from the vehicle width direction, the longitudinal partition portion 32 is set to extend from a position overlapping with a hip point HP of the sitting occupant P to near a lower side of an underarm U toward a center of the shoulder S. Note that a position of the center of the shoulder S is a position of a shaft center of a bolt 50 provided in the shoulder S of the world side impact dummy P sitting on the vehicle seat 12.

Figure 3:
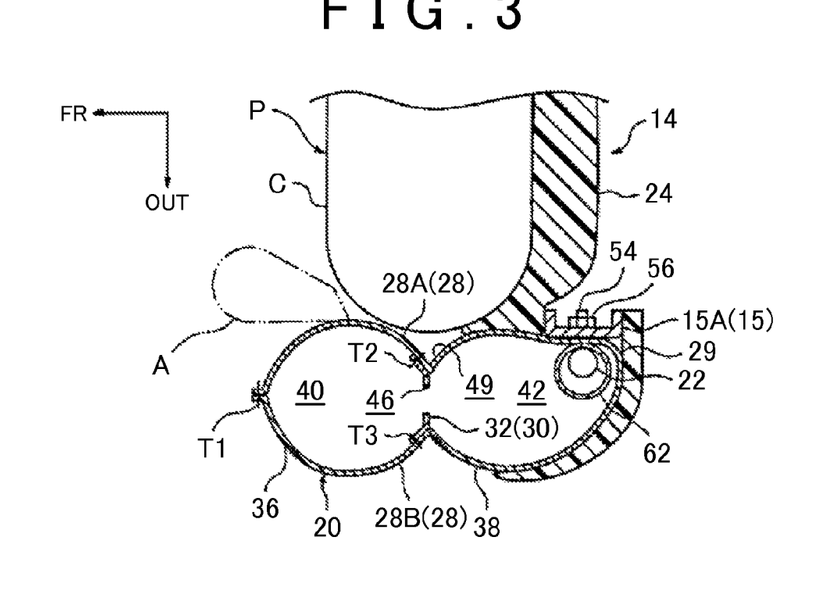
FIG. 3 is a reduced sectional view illustrating a cut surface taken along a line F3-F3 of FIG. 2 in a reduced manner.

The longitudinal partition portion 32 is provided so as to face intermediate parts, in the front-rear direction, of the chest C, the abdomen B, and the lumbar L of the sitting occupant P in the expanded unfolded state of the side air bag 20. Hereby, front parts of the chest C, the abdomen B, and the lumbar L of the sitting occupant P are restrained by the front bag portion 36, and rear parts of the chest C, the abdomen B, and the lumbar L are restrained by the rear bag portion 38. In the vicinity of the longitudinal partition portion 32, an inner side surface of the side air bag 20 in the vehicle width direction is recessed outwardly in the vehicle width direction to form a recessed portion 49, as illustrated in FIG. 3. The recessed portion 49 extends in the seatback height direction along the longitudinal partition portion 32. The recessed portion 49 faces the intermediate part, in the front-rear direction, of the chest C (that is, a most projecting part toward the outer side in the vehicle width direction).

In the meantime, the partition portion 34 is inclined relative to the front-rear direction of the seatback 14, that is, a direction (a direction along an alternate long and short dash line X in FIG. 2) perpendicular to the height direction of the seatback 14 (a direction along an alternate long and short dash line Y in FIG. 2) in a seat side view, so as to go upward toward the front side of the seatback 14. Note that the height direction of the seatback 14 is a direction that connects a shaft center of a reclining rod 52 and a center, in the front-rear direction, of an upper end of a seatback frame 15 in a seat side view. Further, in the present embodiment, an inclination angle θ of the upper partition portion 34 relative to the front-rear direction of the seatback 14 is set within 40 to 50 degrees, for example. The inclination angle θ is preferably an angle at which the upper partition portion 34 is generally perpendicular to a longitudinal direction of the upper arm A, in a state where the upper arm A of the sitting occupant P or the world side impact dummy P is set to an angle defined by the side impact test procedure. More specifically, the inclination angle θ is preferably within 30 to 60 degrees, and more preferably within 40 to 50 degrees.

When the expanded unfolded state of the side air bag 20 is viewed from the vehicle width direction, the upper partition portion 34 is set so as to be placed near a center between a center of the shoulder S of the sitting occupant P and a longitudinally central part of the upper arm A (a position of a centroid AG of the upper arm A or a position near the centroid AG). When the upper partition portion 34 is set as such, a forward extending portion 38A partitioned from the front bag portion 36 is formed in an upper part of the rear bag portion 38. The forward extending portion 38A is expanded and unfolded toward the upper side of the front bag portion 36, so as to restrain the shoulder S of the sitting occupant P. Note that, in the present embodiment, at least a range of a virtual circle VC (see FIG. 2) with a diameter of 80Φ to 100φ around the shaft center of the bolt 50 provided in the shoulder S is restrained by the forward extending portion 38A.

Figure 4:
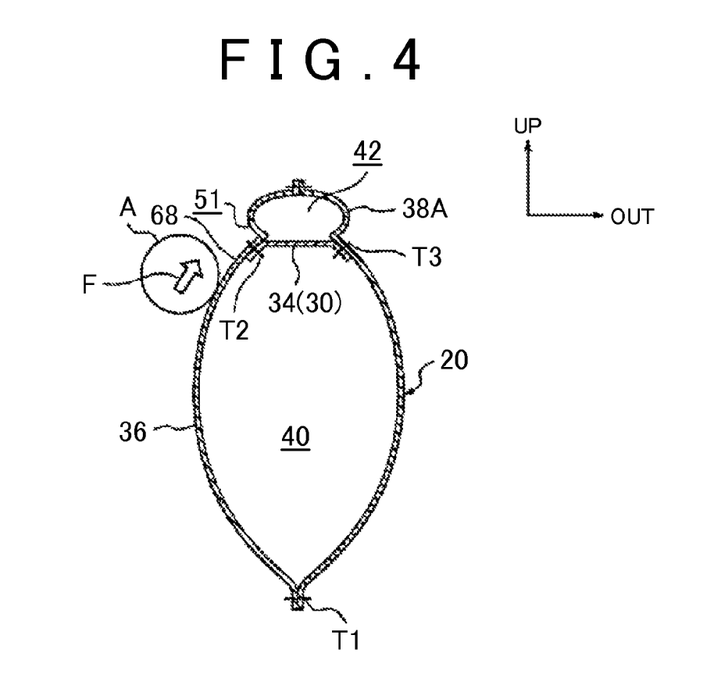
FIG. 4 is a reduced sectional view illustrating a cut surface taken along a line F4-F4 of FIG. 2 in a reduced manner.

Further, in the vicinity of the upper partition portion 34, the inner side surface of the side air bag 20 in the vehicle width direction is recessed outwardly in the vehicle width direction to form a recessed portion 51, as illustrated in FIG. 4. The recessed portion 51 is provided so as to extend diagonally upward toward the front side of the seatback 14 along the upper partition portion 34. Further, an inner side surface of the front bag portion 36 in the vehicle width direction is curved so that its upper side relative to its central part in the vertical direction goes upward toward the outer side in the vehicle width direction (directed toward the outer side in the vehicle width direction as it goes upward).

Note that, in the present embodiment, the side air bag 20 is formed by sewing the base cloth 28 and the tether 30. However, the present embodiment is not limited to this, and a manufacturing method of the side air bag 20 is not limited in particular. For example, the side air bag may be formed by a double-weaving method (a so-called OPW method) using an automatic loom.

Further, in the present embodiment, the longitudinal partition portion 32 and the upper partition portion 34 are both constituted by the tether 30. However, the present embodiment is not limited to this, and the longitudinal partition portion 32 may be constructed by the tether 30 and the upper partition portion may be constituted by a seam (a sewing portion). Further, in the present embodiment, the longitudinal partition portion 32 and the upper partition portion 34 are set to be unfolded linearly in a side view as illustrated in FIGS. 1 and 2. However, the present embodiment is not limited to this, and the longitudinal partition portion 32 and the upper partition portion 34 may be unfolded in an arc shape in a side view.

In the meantime, the inflator 22 is a so-called cylinder inflator, and is formed in a columnar shape. The inflator 22 is disposed inside the rear bag portion 38 in a state where its axis direction is along the height direction of the seatback 14. In a state where the side air bag 20 is expanded and unfolded, the inflator 22 is provided so as to be placed near a central part, in the vertical direction, of the rear end of the rear bag portion 38.

A pair of upper and lower stud bolts 54 (see FIG. 3) project from an outer peripheral part of the inflator 22 toward the inner side in the vehicle width direction. The stud bolts 54 penetrate through the one side portion 28A of the base cloth 28 and a side frame 15A of the seatback frame 15, and nuts 56 are threadedly engaged with their tip sides. Hereby, the inflator 22 and the side air bag 20 are fastened and fixed to the side frame 15A (so-called side surface fastening). Note that, the stud bolts projecting toward a vehicle rear side from the outer peripheral part of the inflator 22 may penetrate through a bracket (a reaction plate) or the like having a L-shaped flat section and fixed to the side frame 15A from the vehicle front side so as to be engaged threadedly to nuts (so-called back surface fastening).

A gas ejection portion 22A (see FIG. 2) is provided on an upper end side of the inflator 22 (see FIG. 2). A plurality of gas ports aligned in a circumferential direction of the inflator 22 is formed in the gas ejection portion 22A. When the inflator 22 is activated, gas is ejected radially from the plurality of gas ports.

A side collision ECU 58 provided in the vehicle is electrically connected to the inflator 22, as illustrated in FIG. 1. A side collision sensor 60 configured to detect a side collision is electrically connected to the side collision ECU 58. The side collision ECU 58 is configured to activate the inflator 22 at the time when the side collision ECU 58 detects a side collision (inevitability thereof) based on a signal from the side collision sensor 60. Note that, in a case where a pre-crash sensor that predicts (foresees) a side collision is electrically connected to the side collision ECU 58, the side collision ECU 58 may be configured to activate the inflator 22 at the time when the side collision ECU 58 predicts a side collision based on a signal from the pre-crash sensor.

The inflator 22 is covered with an inner tube (a rectification cloth) 62. The inner tube 62 is formed by sewing, in a tubular shape, a fabric material similar to the base cloth 28 of the side air bag 20, and the inflator 22 is inserted into the inner tube 62. The pair of upper and lower stud bolts 54 of the inflator 22 penetrate through the inner tube 62, and part of the inner tube 62 is sandwiched between the inflator 22 and the one side portion 28A of the base cloth 28. The inner tube 62 has a function (a function to rectify gas) to guide gas ejected from the inflator 22 to the upper side and the lower side by upper and lower openings (see arrows G1, G2 in FIG. 2). Gases G1, G2 ejected from the inner tube 62 are supplied into the rear bag portion 38, and then supplied to the front bag portion 36 through the communicating openings 46, 48 of the longitudinal partition portion 32. Accordingly, an internal pressure of the rear bag portion 38 is higher than an internal pressure of the front bag portion 36. That is, in the present embodiment, the inflator 22 is provided in the rear bag portion 38 and the communicating openings 46, 48 are formed in the longitudinal partition portion 32, thereby constituting internal pressure adjusting means configured to increase the internal pressure of the rear bag portion 38 to be higher than the internal pressure of the front bag portion 36.

Further, the side air bag 20 according to the present embodiment is configured such that, in the expanded unfolded state, a dimension, in the vehicle width direction, of a front side (the front bag portion 36) on a lower side relative to the forward extending portion 38A is smaller than a dimension, in the vehicle width direction, of a rear side (a main body portion of the rear bag portion 38) on a lower side relative to the forward extending portion 38A. Further, the side air bag 20 is configured such that a dimension, in the vehicle width direction, of the forward extending portion 38A in the expanded unfolded state is smaller than a dimension, in the vehicle width direction, of the front bag portion 36. When the dimension, in the vehicle width direction, of the forward extending portion 38A is set smaller than the dimension, in the vehicle width direction, of the front bag portion 36 as such, an inner side surface, in the vehicle width direction, of an upper side of the front bag portion 36 serves as an upper arm push-up surface 68 curved so that it goes upward toward the outer side in the vehicle width direction (directed outward in the vehicle width direction as it goes upward), as illustrated in FIG. 4. Note that the upper arm push-up surface 68 may be configured to be inclined upward toward the outer side in the vehicle width direction.

Operations and Effects

Next will be described operations and effects of the first embodiment.

In the side air bag device 10 configured as described above, when the side collision ECU 58 detects a side collision based on a signal from the side collision sensor 60, the inflator 22 is activated by the side collision ECU 58. Then, the gas ejected from the inflator 22 is supplied into the side air bag 20, and the side air bag 20 is expanded and unfolded between the sitting occupant P and a door trim of the side door. In the side air bag 20, the front bag portion 36 that restrains the front parts of the chest C, the abdomen B, and the lumbar L of the sitting occupant P and the rear bag portion 38 that restrains the rear parts of the chest C, the abdomen B, and the lumbar L are partitioned by the longitudinal partition portion 32. The inflator 22 is provided in the rear bag portion 38, and the gas generated from the inflator 22 is supplied into the front bag portion 36 via the communicating openings 46, 48 provided in the longitudinal partition portion 32 (see arrows G3, G4 in FIG. 2). This makes it possible to expand and unfold the rear bag portion 38 earlier at a higher pressure than the front bag portion 36, thereby making it possible to restrain, at an early stage, those rear parts of the chest C and the abdomen B which have resistances relatively higher than the front parts of the chest C and the abdomen B by the rear bag portion 38.

Further, the forward extending portion 38A configured to restrain the shoulder S of the sitting occupant P is provided in the upper part of the rear bag portion 38. The forward extending portion 38A is expanded and unfolded at an early stage, so that the shoulder S of the sitting occupant P can be restrained at an early stage. Besides, the forward extending portion 38A is partitioned from the front bag portion 36 by the upper partition portion 34 extending diagonally upward toward the front side of the seatback 14 from the upper end of the longitudinal partition portion 32, and is expanded and unfolded toward the upper side of the front bag portion 36. That is, the upper partition portion 34 extending upward relative to the front-rear direction of the seatback 14 is set, and hereby, the upper part (the forward extending portion 38A) of the rear bag portion 38 extends toward the upper side of the front bag portion 36, so as to restrain the shoulder S of the sitting occupant P. The inclination angle θ of the upper partition portion 34 relative to the front-rear direction of the seatback 14 is set within 40 to 50 degrees, for example. Hereby, it is possible to suppress an increase in a capacity of the rear bag portion 38, and to make the upper part (the forward extending portion 38A) of the rear bag portion 38 successfully face the shoulder S of the sitting occupant P. As a result, the rear parts of the chest C and the abdomen B, and the shoulder S can be restrained effectively, which is able to improve a restraining performance of the side air bag 20 with respect to the sitting occupant P.

Further, as illustrated in FIG. 4, the inner side surface, in the vehicle width direction, of the front bag portion 36 expanded and unfolded is curved so that its upper side relative to its central part in the up-down direction goes upward toward the outer side in the vehicle width direction (see the upper arm push-up surface 68 illustrated in FIG. 4). Hereby, the side air bag 20 and the sitting occupant P relatively come close to each other due to an impact of a side collision, so that the upper arm push-up surface 68 makes slide contact with the upper arm A of the sitting occupant P, thereby causing a force F to push up the upper arm A. As a result, the upper arm A is pushed up to the upper part of the front bag portion 36 and restrained by the forward extending portion 38A. Hereby, it is possible to restrain the upper arm A from being placed between the chest C of the sitting person P and the side air bag 20, thereby making it possible to reduce a load to the chest C.

Besides, in the present embodiment, when the expanded unfolded state of the side air bag 20 is viewed from the vehicle width direction, the upper partition portion 34 is placed near the center between the center of the shoulder S of the sitting occupant P and the longitudinally central part of the upper arm A (near the centroid AG of the upper arm A). Accordingly, in comparison with a case where the upper partition portion 34 is set near the centroid AG of the upper arm A, a push-up force F of the front bag portion 36 to the upper arm A can be successfully applied to near the centroid AG of the upper arm A. Hereby, the upper arm A can be pushed up effectively.

That is, if the upper partition portion 34 is set along a line X in FIG. 2, for example, the upper partition portion 34 passes near the centroid AG of the upper arm A. As illustrated in FIG. 4, in the vicinity of the upper partition portion 34, the inner side surface of the side air bag 20 in the vehicle width direction is recessed outwardly in the vehicle width direction to form the recessed portion (valley) 51. Accordingly, the recessed portion 51 abuts with a vicinal area of the centroid AG of the upper arm A. The recessed portion 51 is formed in the upper end (an end point on the upper side) of the upper arm push-up surface 68, so a distance and a time of slide contact between the vicinal area of the centroid AG of the upper arm A and the upper arm push-up surface 68 are shortened, which makes it difficult to sufficiently apply the push-up force F to near the centroid AG of the upper arm A. In contrast, in the present embodiment, when the upper arm A begins to make slide contact with the upper arm push-up surface 68, the centroid AG is sufficiently distanced downward from the recessed portion 51 (the upper partition portion 34), the push-up force F from the upper arm push-up surface 68 can be successfully applied to the vicinal area of the centroid AG of the upper arm A. As a result, the upper arm A can be pushed up effectively.

Besides, the forward extending portion 38A extends from a lateral side of the shoulder S of the sitting occupant P toward the vehicle front side, so as to be placed on the upper side of the front bag portion 36, as described above. Accordingly, even in a case where a side collision is a so-called oblique side collision and the sitting occupant P moves obliquely toward the vehicle front side in an inertial manner, for example, it is still possible to prevent the shoulder S of the sitting occupant P from coming off from the forward extending portion 38A. Accordingly, regardless what type the side collision is, the shoulder S of the sitting occupant P can be restrained by the side air bag 20 successfully, and the shoulder S can be continued to be restrained until a second half of the collision. Note that, in the vehicle side air bag device described in Background Art, in a case where the sitting occupant P moves obliquely toward the vehicle front side in an inertial manner at the time of an oblique side collision, the shoulder of the sitting occupant may come off from the shoulder restraining portion. However, the present embodiment can prevent this problem.

Further, in the present embodiment, in a case where the side air bag 20 is cut along a line that connects the center (the bolt 50) of the shoulder S of the sitting occupant P to the centroid AG of the upper arm A in FIG. 2, the recessed portion 51 is formed between the center of the shoulder S and the centroid AG of the upper arm A. The recessed portion 51 extends diagonally upward toward the front side of the seatback 14 along the upper partition portion 34. Accordingly, a curved surface curved outwardly in the vehicle width direction as it goes diagonally downward toward the front side of the seatback 14 is formed on the front end side of the forward extending portion 38A. Hereby, at the time when the side air bag 20 expanded and unfolded and the sitting occupant P relatively come close to each other due to an impact of a side collision, the shoulder S of the sitting occupant P on the outer side in the vehicle width direction moves toward the upper partition portion 34 (the vehicle front side) along the curved surface formed on the front end side of the forward extending portion 38A, in addition to the push-up operation on the upper arm A as described above. As a result, the upper body of the sitting occupant P is rotated around a generally vertical axis in a direction where the shoulder S on the outer side in the vehicle width direction moves toward the vehicle front side, so that the back of the sitting occupant P faces the side air bag 20. Hereby, the back side having a relatively high load resistance can be restrained effectively by the side air bag 20. Further, since the chest C is displaced (rotated) to a direction distanced from the side air bag 20, it is possible to further reduce a load to the chest C. Besides, the shoulder S on the outer side in the vehicle width direction moves toward the vehicle front side so as to be fitted into the recessed portion 51, so that the shoulder S is hard to come off from the forward extending portion 38A, which is a shoulder restraining portion, thereby resulting in that the shoulder S can be continued to be restrained even at the time of an oblique collision.

Further, in the present embodiment, when the expanded unfolded state of the side air bag 20 is viewed from the vehicle width direction, the longitudinal partition portion 32 is set to extend from a position overlapping with the hip point HP of the sitting occupant P to the lower side of the underarm U toward the center of the shoulder S. Accordingly, side surfaces of the chest C and the abdomen B of the sitting occupant P can be restrained by the front bag portion 36 and the rear bag portion 38 so that the side surfaces are covered therewith along their curves from the front side and the rear side. Hereby, a positional relationship, in the vehicle front-rear direction, of the chest C and the abdomen B with the side air bag 20 can be stabilized.

Further, in the present embodiment, the longitudinal partition portion 32 and the upper partition portion 34 are constituted by the tether 30 sewed to the base cloth 28 of the side air bag 20. Hereby, in a state where the side air bag 20 is expanded and unfolded, the inner side surface of the side air bag 20 in the vehicle width direction is recessed outwardly in the vehicle width direction near the longitudinal partition portion 32 and the upper partition portion 34. An intermediate part, in the front-rear direction, of the side surface of the chest C (that is, a most projecting part toward the outer side in the vehicle with direction; the central part in the front-rear direction or near the central part in the front-rear direction) is fitted into the recessed portion 49 formed near the longitudinal partition portion 32. Hereby, it is possible to reduce a load to the chest C (ribs, or the like). Further, the upper arm A pushed up by slide contact with the front bag portion 36 is fitted into the recessed portion 51 formed near the upper partition portion 34. Hereby, it is possible to successfully restrain the upper arm A at a position where the upper arm A is pushed up.

Further, in the present embodiment, the longitudinal partition portion 32 and the upper partition portion 34 are constituted by the tether 30. Accordingly, expansion thicknesses (dimensions in the vehicle width direction in the expanded unfolded state) of the front bag portion 36 and the rear bag portion 38 can be increased just by a width dimension of the tether 30. This makes it possible to successfully secure impact absorption strokes of the front bag portion 36 and the rear bag portion 38.

Note that, in the first embodiment, in a case where the upper partition portion 34 is constituted by a seam (a sewing portion), it is possible to achieve a large curve of the upper arm push-up surface 68, thereby making it possible to increase the push-up force F applied to the upper arm A. The same applies to a case where the upper partition portion 34 is constituted by a tether with a width thinner than the tether 30.

Further, in the first embodiment, the pair of upper and lower communicating openings 46, 48 are formed in the longitudinal partition portion 32, and no communicating opening is formed in the upper partition portion 34. However, the present invention is not limited to this, and one or more communicating openings may be formed in each of the longitudinal partition portion 32 and the upper partition portion 34.

Next will be described another embodiment of the present invention. Note that a configuration/operation basically similar to a configuration/operation of the first embodiment has the same reference sign as the configuration/operation of the first embodiment, and its description is omitted.

Second Embodiment

Figure 5:
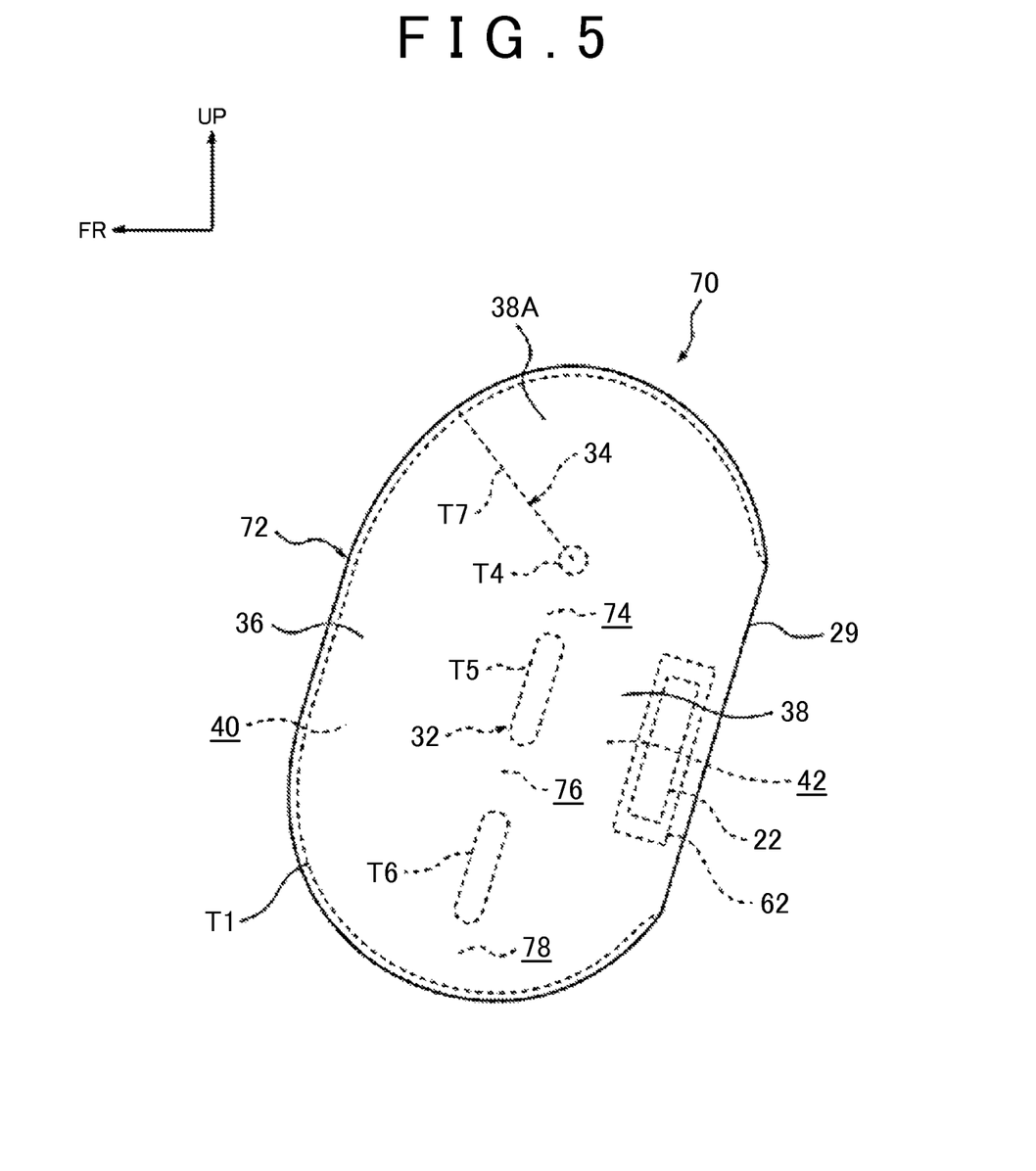
FIG. 5 is a side view illustrating a state where a side air bag of a vehicle side air bag device according to a second embodiment of the present invention is expanded and unfolded.

FIG. 5 is a side view illustrating an expanded unfolded state of a side air bag 72, which is a constituent member of a vehicle side air bag device 70 according to a second embodiment of the present invention. In the side air bag 72, the tether 30 according to the first embodiment is omitted, and a front bag portion 36 and a rear bag portion 38 are partitioned by seams (sewing portions) T4, T5, T6 constituting a longitudinal partition portion 32, and a seam (a sewing portion) T7 constituting an upper partition portion 34. The seams T4, T5, T6 are set so as to be aligned in the vertical direction near a central part of the side air bag 72 in the vertical direction. The upper seam T4 is formed in a round shape, and the central seam T5 and the lower seam T6 are formed in an elliptical shape elongated in a height direction of a seatback 14 (not shown in FIG. 5). Further, the seam T7 constituting the upper partition portion 34 extends diagonally upward toward a front side of the seatback 14 from the seam T4, that is, an upper end of the upper partition portion 34.

Communicating openings 74, 76, 78 are formed, respectively, between the seam T4 and the seam T5, between the seam T5 and the seam T6, and between the seam T6 and a lower end of the side air bag 72, and a front chamber 40 communicates with a rear chamber 42 via these communicating openings.

The side air bag device 70 has the same configuration as the side air bag device 10 according to the first embodiment except for the above configuration. Accordingly, basically the same effect as the first embodiment can be obtained. Besides, since the longitudinal partition portion 32 and the upper partition portion 34 are constituted by the seams T4, T5, T6, T7, it is possible to manufacture the side air bag 72 at a low cost.

Third Embodiment

Figure 6:
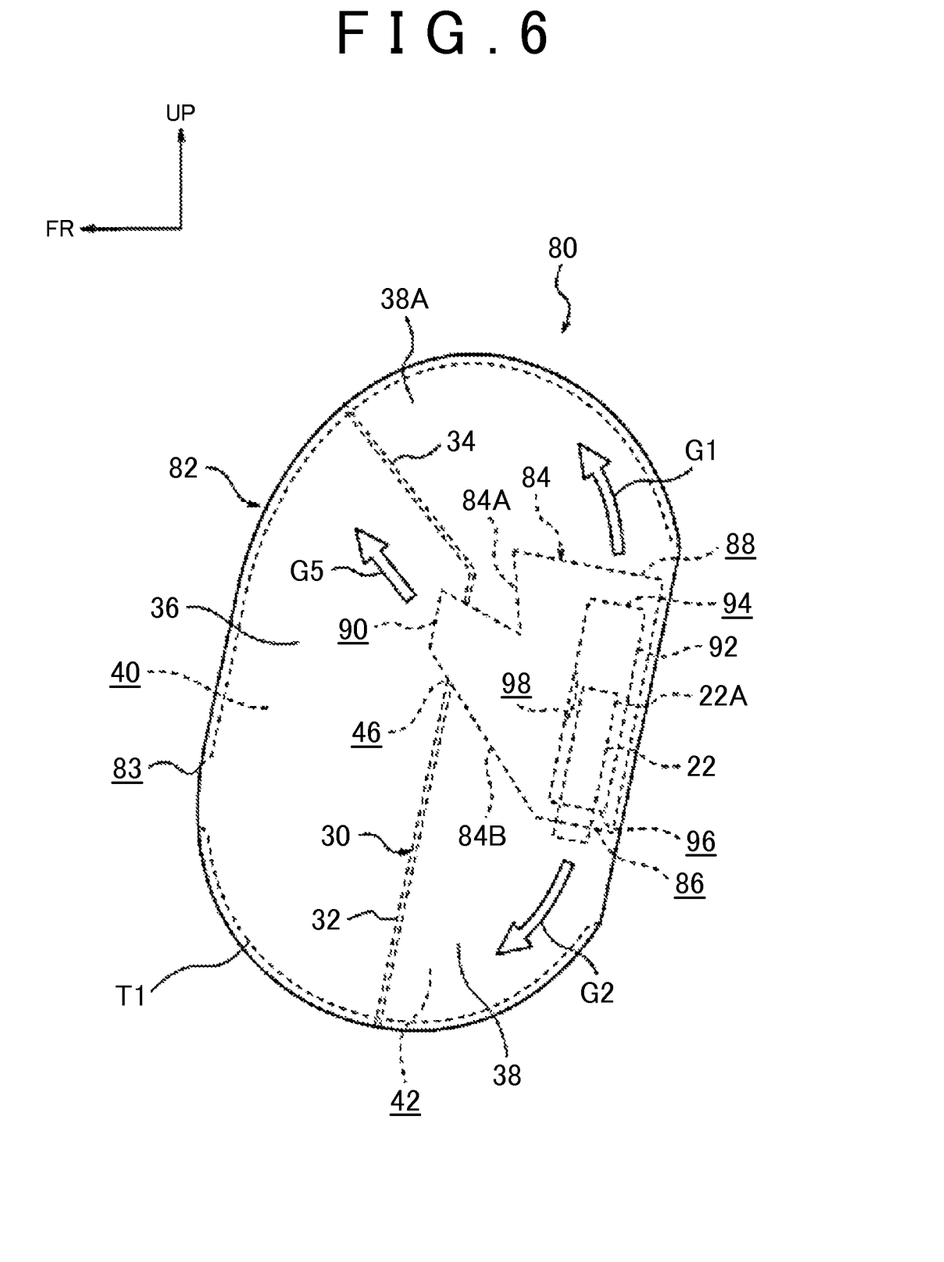
FIG. 6 is a side view illustrating a state where a side air bag of a vehicle side air bag device according to a third embodiment of the present invention is expanded and unfolded.

FIG. 6 is a side view illustrating an expanded unfolded state of a side air bag 82, which is a constituent member of a vehicle side air bag device 80 according to a third embodiment of the present invention. The side air bag 82 has basically the same configuration as the side air bag 20 according to the first embodiment, but the communicating opening 48 according to the first embodiment is omitted. Further, in the side air bag 82, a sewing portion T1 is omitted (divided) in part of a bottom end side of a front end of a front bag portion 36, so that a vent hole 83 is formed.

Further, in the side air bag device 80, a configuration of an inner tube (a rectification cloth: a rectification member) 84 is different from that of the inner tube 62 according to the first embodiment. The inner tube 84 is constituted by a body portion 84A sewed in a tubular shape that is increased in a diameter toward an upper end side, and a branch portion 84B sewed in a tubular shape and branched from the body portion 84A. The body portion 84A is set such that an aperture area of an upper opening 88 formed in an upper end is larger than an aperture area of a lower opening 86 formed in a lower end. An inflator 22 is covered with the body portion 84A.

The branch portion 84B is formed so that its diameter is decreased toward a tip side. The tip side of the branch portion 84B is inserted into a communicating opening 46 of a longitudinal partition portion 32, and a tip opening 90 is opened toward an upper part of a front chamber 40. Hereby, an inside of the body portion 84A communicates with the front chamber 40 via an inside of the branch portion 84B. The tip opening 90 is placed on a side upper than the vent hole 83. Note that, in the present embodiment, the inner tube 84 including the body portion 84A and the branch portion 84B is formed by sewing one fabric material. However, the present embodiment is not limited to this, and the sewing method of the inner tube 84 can be modified appropriately.

In a state where the side air bag 82 is expanded and unfolded, the branch portion 84B extends diagonally upward toward the vehicle front side from the body portion 84A, and a tip of the branch portion 84B is placed near a lower side of the upper partition portion 34. A direction in which the branch portion 84B extends is set generally parallel to a direction in which the upper partition portion 34 extends.

Further, in this embodiment, the inflator 22 is covered with a cylindrical diffuser 92. The diffuser 92 includes an upper end opening 94 configured to guide gas ejected from a gas ejection portion 22A of the inflator 22 to the upper side, a lower end opening 96 configured to guide the gas toward the lower side, and a front end opening 98 configured to guide the gas toward the front side. This embodiment has a configuration similar to the first embodiment except for the above configuration.

In the side air bag device 80 thus configured, the gas ejected from the lower end opening 96 of the diffuser 92 is guided to the lower side by the lower opening 86 of the body portion 84A (see an arrow G2 in FIG. 6). Hereby, a lower part side of the rear bag portion 38 is promoted to be expanded and unfolded. Further, the gas ejected from the upper end opening 94 of the diffuser 92 is guided to the upper side and the vehicle front side (a forward-extending-portion-38A side) by the upper opening 88 of the body portion 84A (see an arrow G1 in FIG. 6). Hereby, that upper side of the rear bag portion 38 which includes the forward extending portion 38A is promoted to be expanded and unfolded. Besides, the aperture area of the upper opening 88 is set larger than the aperture area of the lower opening 86, so that more gas can be flowed toward the upper opening 88 of the body portion 84A. This makes it possible to supply, at an early stage, gas to that upper side of the rear bag portion 38 which includes the forward extending portion 38A, so that the shoulder S of the sitting occupant P can be restrained at an early stage.

Further, in this embodiment, the tip opening 90 of the branch portion 84B branched from the body portion 84A is opened toward the front chamber 40, and gas ejected from the tip opening 90 of the diffuser 92 toward the vehicle front side is supplied to an upper part of the front chamber 40 through the branch portion 84B (see an arrow G5 in FIG. 6). As such, the exclusive branch portion 84B to supply gas to the upper part of the front chamber 40 is provided, so that the upper part of the front chamber 40 can be promoted to be expanded and unfolded. As a result, the upper arm A can be pushed up by the upper part of the front bag portion 36 at an early stage.

Besides, in the present embodiment, the diameter of the branch portion 84B is decreased toward the tip side, it is possible to increase a flow speed of the gas G5 ejected from the tip opening 90 of the branch portion 84B. As a result, an effect of pushing up the upper arm A by the upper part of the front bag portion 36 can be promoted.

Further, in the present embodiment, the gas G5 guided from the tip opening 90 of the branch portion 84B of the inner tube 84 to the upper part of the front bag portion 36 is discharged outside the side air bag 82 via the vent hole 83 formed in the front end of the front bag portion 36 on a side lower than the tip opening 90. Hereby, it is possible to prevent the internal pressure of the front bag portion 36 from increasing too high, thereby making it possible to reduce a load to the front parts of the chest C and the abdomen B having relatively low resistances. Besides, the tip opening 90 of the branch portion 84B and the vent hole 83 are offset to the upper side and to the lower side, so that it is possible to prevent the gas G5 supplied into the front bag portion 36 from the tip opening 90 from being discharged outside directly (linearly) from the vent hole 83, and to secure an initial unfolding performance of the upper part of the front bag portion 36. Further, it is also possible to adjust the internal pressure of the rear bag portion 38 by discharging, outside the side air bag 82 from the vent hole 83, the gas flowed into the front bag portion 36 from the rear bag portion 38 through the inner tube 84.

Supplementary Description of Embodiments

In the third embodiment, the side air bag 82 is configured to be partitioned by the tether 30 into the front bag portion 36 and the rear bag portion 38. However, the present embodiment is not limited to this, and the side air bag 82 may be configured to be partitioned by a seam into the front bag portion 36 and the rear bag portion 38.

Further, in the third embodiment, the branch portion 84B is formed in a tubular shape of which the diameter is decreased toward the tip side. However, the present embodiment is not limited to this, and all parts of the branch portion 84B may be formed to have the same diameter.

Further, in each of the first to third embodiments, the shoulder S, the chest C, the abdomen B, and the lumbar L of the sitting occupant P are restrained by the side air bag 20, 72, 82. However, each of the embodiments is not limited to this, and the side air bag is configured to be able to restrain at least the shoulder, the chest, and the abdomen of the sitting occupant.

Further, in the side air bags 20, 72 of the first, second embodiments, a vent hole 83 may be formed in a lower part of a front edge portion, similarly to the side air bag 82 of the third embodiment.

Note that the entirety of the disclosure of Japanese Patent Application No. 2012-160476 is incorporated herein by reference. Further, all the documents, patent applications, and technical standards described in the present specification are hereby incorporated herein by reference to the same extent as in cases where each document, patent application or technical standard is specifically and individually described as being incorporated by reference.

In addition, the present invention can be performed with various modifications without departing from a gist of the present invention. Further, it is needless to say that a scope of the present invention is not limited to each of the above embodiments.

The invention claimed is:

1. A vehicle side air bag device comprising:
   an inflator provided in a vehicle seat and configured to be activated to generate gas when a side collision of a vehicle is detected or predicted; and
   a side air bag provided in a side portion of a seatback of the vehicle seat and configured to be expanded and unfolded between a standardized sitting occupant and a vehicle-body side portion when the gas generated from the inflator is supplied to an inside of the side air bag,
   the side air bag including:
      a front bag portion configured to restrain front parts of a chest and an abdomen of the standardized sitting occupant;
      a rear bag portion configured to restrain rear parts of the chest and the abdomen of the standardized sitting occupant, the rear bag portion being configured such that a forward extending portion configured to restrain a shoulder of the standardized sitting occupant is provided in an upper part of the rear bag portion and the inflator is provided inside the rear bag portion;
      a longitudinal partition portion configured to partition the front bag portion from the rear bag portion, the longitudinal partition portion having a communicating opening configured to communicate an inside of the front bag portion with an inside of the rear bag portion; and
      an upper partition portion extending diagonally upward toward a front side of the seatback from an upper end of the longitudinal partition portion in an expanded and unfolded state of the side air bag, the upper partition portion being configured to partition the forward extending portion from the front bag portion and to extend upward toward the front side relative to a front-rear direction of the seatback which is perpendicular to a height direction of the seatback in a seat side view.

2. The vehicle side air bag device according to claim 1, wherein:
   when the expanded and unfolded state of the side air bag is viewed from a vehicle width direction, the upper partition portion is configured to be placed between a center of the shoulder of the standardized sitting occupant and a longitudinally central part of an upper arm of the standardized sitting occupant.

3. The vehicle side air bag device according to claim 1, wherein:
when the expanded and unfolded state of the side air bag is viewed from a vehicle width direction, the longitudinal partition portion is configured to extend toward a center of the shoulder of the standardized sitting occupant from a position overlapping with a hip point of the standardized sitting occupant up to a lower side of an underarm of the standardized sitting occupant.

4. The vehicle side air bag device according to claim 1, wherein:
the longitudinal partition portion and the upper partition portion are constituted by a tether sewn to a base cloth of the side air bag or a seam formed by sewing the base cloth.

5. The vehicle side air bag device according to claim 1, wherein:
a rectification member covering the inflator is provided in the rear bag portion, the rectification member including a body portion configured to guide the gas generated from the inflator to a vertical direction, and a branch portion branched from the body portion so that a tip side of the branch portion is inserted into the communicating opening, the branch portion being configured to guide the gas into the front bag portion along the upper partition portion from a tip opening of the branch portion opened into the front bag portion.

6. The vehicle side air bag device according to claim 5, wherein:
the branch portion is formed in a tubular shape of which a diameter is decreased toward the tip side.

7. The vehicle side air bag device according to claim 5, wherein:
a vent hole is formed in a front end part of the front bag portion in the expanded and unfolded state such that the vent hole is placed on a side lower than the branch portion.

8. The vehicle side air bag device according to claim 1, wherein:
an inclination angle of the upper partition portion relative to the front-rear direction of the seatback is set within a range of 30 to 60 degrees.

9. The vehicle side air bag device according to claim 1, wherein:
when the expanded and unfolded state of the side air bag is viewed from a vehicle width direction, the forward extending portion is configured so that at least a range of a virtual circle having a diameter of 80ϕ around a center of the shoulder of the standardized sitting occupant is restrained by the forward extending portion.

10. The vehicle side air bag device according to claim 1, wherein:
the height direction of the seatback is a direction connecting a center, in the front-rear direction, of an upper end of a seatback frame to a shaft center of a reclining rod in a seat side view.

11. The vehicle side air bag device according to claim 1, wherein:
the front bag portion is set to have a vehicle-width dimension larger than that of the forward extending portion in the expanded and unfolded state, and
an inner side surface, in a vehicle width direction, of the front bag portion on an upper end side of the front bag portion serves as an upper arm push-up surface inclined or curved so as to extend upward toward an outer side in the vehicle width direction.

* * * * *